(12) United States Patent
Goldstein et al.

(10) Patent No.: US 11,775,534 B2
(45) Date of Patent: Oct. 3, 2023

(54) PREDICTING AND PREVENTING NEGATIVE USER EXPERIENCE IN A NETWORK SERVICE

(71) Applicant: Uber Technologies, Inc., San Francisco, CA (US)

(72) Inventors: Lawrence Benjamin Goldstein, San Francisco, CA (US); Arjun Vora, San Francisco, CA (US); Jai Malkani, San Francisco, CA (US); Nikhil Joshi, San Francisco, CA (US); Eckart Walther, San Francisco, CA (US); Mahdi Namazifar, San Francisco, CA (US); Kathy Brown, San Francisco, CA (US); Praveen Kannan, San Francisco, CA (US); Arun Bodapati, San Francisco, CA (US); Fran Bell, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 476 days.

(21) Appl. No.: 16/264,123

(22) Filed: Jan. 31, 2019

(65) Prior Publication Data
US 2020/0250196 A1      Aug. 6, 2020

(51) Int. Cl.
*G06F 16/2457* (2019.01)
*G06Q 50/30* (2012.01)
*H04L 67/50* (2022.01)
*G06N 20/00* (2019.01)

(52) U.S. Cl.
CPC ....... *G06F 16/24578* (2019.01); *G06Q 50/30* (2013.01); *H04L 67/535* (2022.05); *G06N 20/00* (2019.01)

(58) Field of Classification Search
CPC ... G06F 16/24578; G06Q 50/30; H04L 67/22; G06N 20/00; H04W 4/023; H04W 4/40
See application file for complete search history.

(56) References Cited

U.S. PATENT DOCUMENTS

| | | | | |
|---|---|---|---|---|
| 2015/0161554 A1* | 6/2015 | Sweeney | ............... | G06Q 50/30 705/7.15 |
| 2016/0034828 A1* | 2/2016 | Sarawgi | ............... | G06Q 10/00 705/5 |
| 2019/0050787 A1* | 2/2019 | Munafo | ............... | G06N 20/00 |
| 2019/0205812 A1* | 7/2019 | Afzal | ............... | H04W 4/40 |
| 2019/0244092 A1* | 8/2019 | Baughman | ............... | G06N 7/01 |

* cited by examiner

*Primary Examiner* — Van H Oberly
(74) *Attorney, Agent, or Firm* — MAHAMEDI IP LAW LLP

(57) ABSTRACT

A computing system can receive event data corresponding to a user's experience with a network service. Based on the event data, the system can generate a set of representations that correspond to the user's experience with the network service. The representations may be analyzed and/or filtered by an artificial intelligence model executing on the computing system, which can predict negative experiences of users at future time intervals. Based on these predictions, the computing system can implement a set of corrective actions to steer the user experience to a more positive path.

14 Claims, 5 Drawing Sheets

PREDICTING AND PREVENTING NEGATIVE USER EXPERIENCE IN A NETWORK SERVICE

BACKGROUND

Users of network application services may have negative user experiences that cause them to either change to a different network service, use the network service less often, or abandon the network service. For a service entity managing the application service, identification of negative user experiences is typically done through rating queries or solicitation for feedback of the network service. However, dissatisfied or abdicating users are unlikely to provide feedback or ratings, and the service entity is typically unable to reacquire those users.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
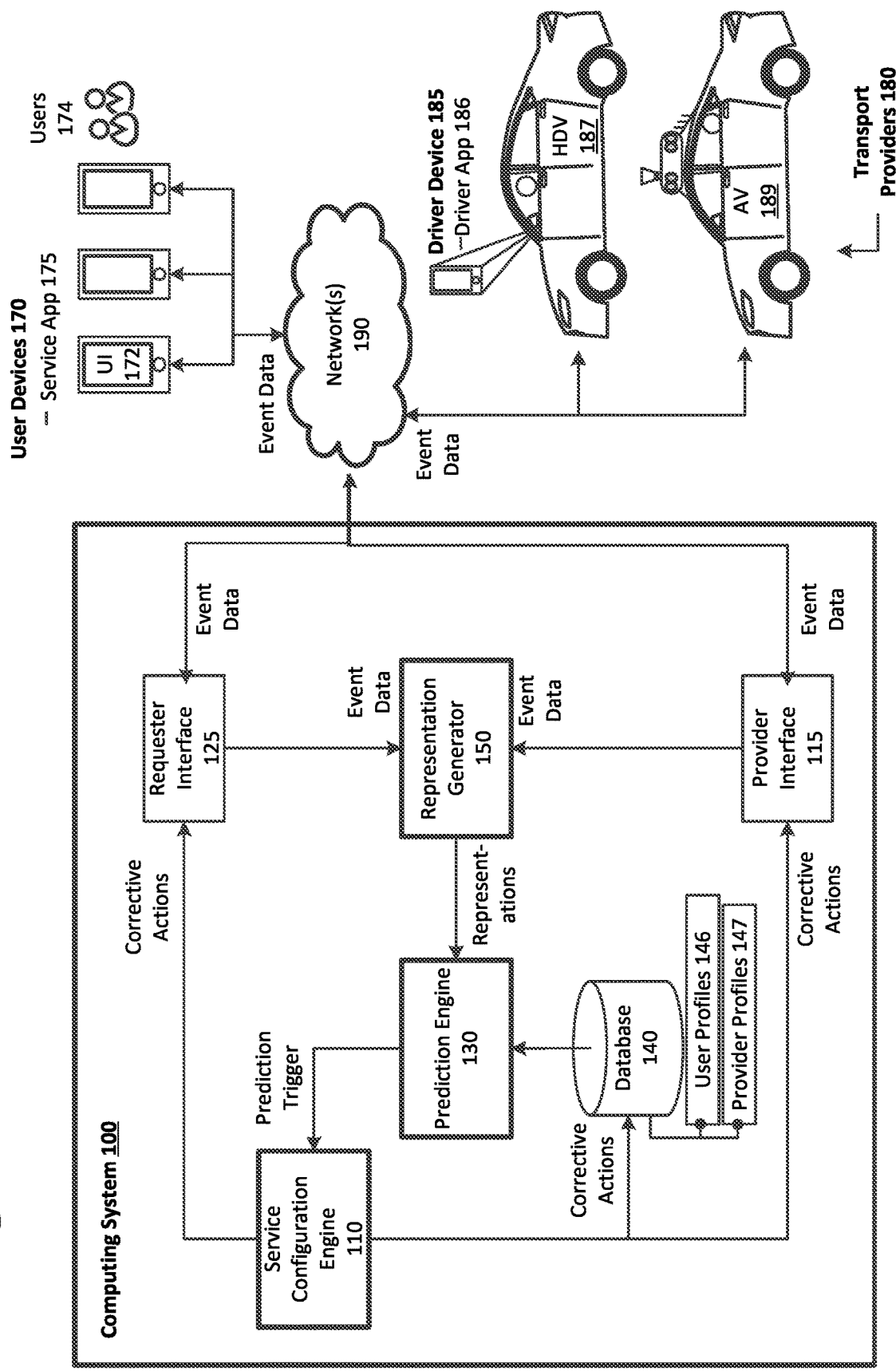
FIG. 1 is a block diagram illustrating an example computing system implementing negative user experience detection and prevention techniques, in accordance with examples described herein.

A network service can be provided to users through a service application executing on the computing devices of the users. Such network services can comprise on-demand transport services, such as passenger transport, comestible good delivery, freight transport, on-demand bicycle or scooter services, and the like. In some aspects, the network service can comprise a social media service, marketplace service, content streaming service, etc. A service entity can coordinate or manage the application service via backend computing systems (e.g., a remote data center), that receive various event data from the computing devices of the users. The event data can comprise user input data corresponding to user inputs on an application interface generated on a display screen of the user's computing device. The event data can further include sensor data and/or location data from sensor and/or positioning system resources on the computing devices of the users. In further aspects, the event data can comprise third party data received from third party sources, such as media sources, mapping and/or traffic modeling sources, scheduling or calendar sources, and the like.

The computing system of the service entity can ingest the event data and generate service representations that correspond to a particular user's experience with the application service. A service representation can comprise a set of event criteria that contextually represents the current user experience of any particular user of the application service at any particular time. For example, a current representation for a user can indicate the status of the user, such as whether the user is on-app (e.g., currently interacting with the executing application), off-app (e.g., has deactivated the application), and the user's current state while the application is executing.

For an on-demand transport service, the state of the user can indicate whether the user is checking marketplace conditions (e.g., estimated times of arrival (ETAs) of proximate drivers, transport prices, etc.), has requested transport, is currently awaiting transport, is currently being transported, is awaiting food item or package delivery, and the like. In various examples, the service representation can further include contextual information, such as a session time for the user interacting with the service application, a wait time for transport, changing ETAs of a matched transport provider, the transport provider's route and/or navigation information, the actual marketplace conditions, current pricing data for the network service, etc. In certain implementations, the service representations can be generated dynamically based on changes to the user's status, state, and the contextual information. In still further implementations, the service representations can be individual to the user based on historical utilization data corresponding to the user's historical usage of the network service (e.g., stored in a user profile of the user). The service representations can further account for the historical utilization of the network service by a matched transport provider (e.g., whether the transport provider has a history of good performance or a propensity towards poor performance).

According to examples described herein, the service representations can be analyzed and filtered by the computing system to predict future negative user experiences. In various aspects, the computing system can execute an artificial intelligence model that can analyze the service representations in accordance with a set of goals. These goals can include preventing user abandonment or abdication of the network service (e.g., deletion of the service application), enhancing user experience, bolstering the quality of the network service, and maximizing engagement of the user to the network service. The artificial intelligence model can further utilize a set of preventative and/or mitigative tools to prevent or mitigate negative user experiences. In certain implementations, these tools can comprise notifications to the user and/or transport provider (e.g., inducing a transport provider to follow displayed navigation data), providing service benefits to mitigate poor user experience or encourage good performance (e.g., discount offers to the user, or bonus payments to well-performing transport providers), demerits (e.g., transport provider demerits indicating poor service performance), automatic service re-matching (e.g., when ETA of a transport provider to a pick-up location increases beyond a certain threshold time or rate), and various other preemptive and reactive actions.

In various implementations, the artificial intelligence model can analyze the service representations dynamically and predict that a negative user experience will occur at a future point in time. For example, the artificial intelligence model can analyze the service representations and calculate or otherwise determine a probability that a negative user experience will occur (e.g., in the next thirty seconds). When the probability meets or exceeds a certain confidence threshold (e.g., 90%), then the computing system can utilize the set of tools to prevent or mitigate the negative user experience.

In various implementations, the artificial intelligence model can employ deep learning techniques to continuously refine negative experience prediction and detection, as well as the deployment of the preventative and mitigative tools to achieve the goals of maximizing user retention and engagement of those users. It is contemplated that such goals align with the goal of achieving ubiquitous positive user experience across the entire network service platform. It is further contemplated that the artificial intelligence techniques described herein can be implemented for an on-demand transport service and can be performed for transport providers as well as requesting users of the on-demand transport service. Various use-cases of proactively improving user experience in connection with an on-demand transport service are described herein.

Among other benefits, examples described herein achieve a technical effect of utilizing artificial intelligence techniques to predict, prevent, and/or mitigate negative user experiences in connection with a network service. Examples described herein employ deep learning that can be scaled across an entire network service platform and can be optimized globally as a single unifying model for the network service. Such examples can replace existing machine learning models tasked to solve or improve segmented aspects of the network service, which can conflict or be inconsistent with other machine learning models implemented by the network service.

As used herein, a computing device refers to devices corresponding to desktop computers, cellular computing devices and/or smartphones, personal digital assistants (PDAs), laptop computers, virtual reality (VR) or augmented reality (AR) headsets, tablet computing devices, etc., that can provide network connectivity and processing resources for communicating with the system over a network. A computing device can also correspond to custom hardware, in-vehicle devices of automobiles, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system implementing negative user experience detection and prevention techniques, in accordance with examples described herein. In various examples, the computing system 100 can implement a network service via a service application 175 executing on the user computing devices 170 of users 174 of the network service. As described herein, the network service can comprise any application-based service that users 174 utilize through interaction with their user computing devices 170, and can include a social media service, marketplace service (e.g., enabling users to buy and/or sell goods), content streaming service, ridesharing service, a property-sharing service, financial transaction service, and the like. In one example of FIG. 1, the computing system 100 can implement an on-demand transport service that matches requesting users 174 with available transport providers 180. However, as provided herein, the term "user" of the transport service, can comprise either the users 174, the transport providers 180, or both users 174 and transport providers 180.

In various examples, the computing system 100 can communicate, over one or more networks 190, with the service application 175 executing on the user computing devices 170 and the driver application 186 executing on driver computing devices 185 of the transport providers 180. In various aspects, the transport providers 180 can comprise human driven vehicles 187 and/or autonomous vehicles 189. Execution of the service application 175 on the user computing devices 170 can cause a user interface 172 to be displayed on a display screen of each user computing device 170. The user 174 can interact with the user interface 172 to, for example, check current marketplace conditions (e.g., current delivery or transport price levels), request transport (e.g., delivery of goods or passenger transport), provide driver feedback, make payments, view entertainment, news, or advertising content, and the like.

In various examples, the marketplace conditions of the network service (e.g., supply/demand information for the service in a given region or sub-region), the user interactions with the user interface 172, transport provider interactions with the executing driver application 186, sensor data from the computing devices 170, 185 (e.g., image data, accelerometer data, audio data, etc.), and various contextual information for each user 174 and transport provider 180 can comprise event data, which can be received over one or more networks 190 by a requester interface 125 and a provider interface 115 of the computing system 100. In various examples, the computing system 100 can manage and/or coordinate the network service by matching requesting users 174 with available transport providers 180, which can include human-driver vehicles 187 as well as autonomous vehicles 189.

The event data can be processed by the computing system 100 for each user 174 and each transport provider 180. Specifically, the computing system 100 can include a representation generator 150 that can dynamically generate current service representations for each user 174 and each transport provider 180. The representations can indicate the current contextual conditions of the network service individual to the user 174 and/or transport provider 180. For example, a representation for a requesting user 174 can indicate a session time, whether the user 174 has submitted a transport request, whether the user 174 is awaiting a ride with a matched transport provider 180, or whether the user 174 is currently being transported.

The representation can further indicate whether the ETA of a transport provider 180 to a rendezvous location or the user's destination has increased or remained the same for an extended period of time (e.g., more than two minutes). In certain examples, the service representation can indicate a reason for an increasing or stagnant ETA (e.g., unexpected traffic, the transport provider making a wrong turn or staying stationary, the transport provider not following a route trajectory, etc.). The representation can provide further contextual information, such as the nature of a pick-up location (e.g., an airport, home location, business location, etc.), the destination location, requested goods (e.g., comestible items), and the like.

As another example, the representation generator 150 can generate a representation for the transport provider 180. The representation for the transport provider 180 can indicate a session time for the executing driver application 186, a number of matched trips during the session, the current location of the transport provider 180, the transport provider's current status (e.g., on-trip, awaiting a match, off-duty), the current route being driven by the transport provider 180, and the like. The representation can indicate further contextual information, such as traffic conditions, whether the transport provider has canceled a match, the transport provider's interactions with the driver application 186 (e.g., input data), and/or a distance or time to the transport provider's home location.

In various examples, the computing system 100 can include a prediction engine 130 that analyzes the generated representations for each user 174 and transport provider 180. As described herein, the prediction engine 130 can analyze the representations dynamically, as the representations can be dynamically generated for each user 174 and transport provider 180 by the representation generator 150. As further described herein, the prediction engine 130 can comprise an artificial intelligence model that can learn the general behavior of users 174 and transport providers 180 in connection with the network service, the conditions that can result in a negative user experience by the user 174 and/or transport provider 180, and the effectiveness of tools and/or benefits in inducing positive user experience.

According to examples described herein, the prediction engine 130 can access a database 140 comprising user profiles 146 and provider profiles 147 for each user 174 and transport provider 180 that comprises historical data of the user 174 and transport provider 180 in connection with the network service. The user profile 146 for a user 174 can indicate how many transport requests the user 174 has submitted, an average user rating as rated by matched transport providers, how often the user utilizes the network service, cancelations by the user 174, various personal information of the user 174 (e.g., home address, demographic information, etc.), and an engagement level of the user 174 to the network service (e.g., a usage rate or total usage of the network service by the user 174).

The transport provider profile 147 for a transport provider 180 can indicate the experience level of the transport provider 180 (e.g., how long the transport provider 180 has been operating, how many rides or service requests the transport provider 180 has fulfilled, etc.), the current rating of the transport provider 180 as provided by users 174, cancelations by the transport provider 180, demerits the transport provider 180 has accumulated (e.g., warnings, instances of poor quality service or fraud, etc.), and an engagement level of the transport provider 180 with respect to the network service.

The historical data in the user profiles 146 and provider profiles 147 can be accessed by the prediction engine 130 to make predictions of negative user experience that are individual to the user 174 or transport provider 180. In certain implementations, the prediction engine 130 can analyze the representations in accordance with a confidence level (e.g., a probability threshold that the user 174 or transport provider 180 will end up with a negative user experience at a future time interval). Additionally or alternatively, the prediction engine 130 can analyze the contextual information in the representations and determine one or more actions to increase user experience and engagement of the user 174 or transport provider 180 to the network service, such as providing a service benefit (e.g., a discount offer or a bonus). As provided herein, the engagement level of a user 174 or transport provider 180 can comprise an total amount or rate of usage of the network service, and can correspond to an actual monetary figure, a monetary rate (e.g., dollar value over time), or an abstract value (e.g., a points value) or the user 174 or transport provider 180 based on, for example, an average rating, feedback from matched users 174 or transport providers 180, money spent using the network service, etc.

As such, the prediction engine 130 can determine the engagement level of the user 174 to the network service, analyze the representations of the user's current session, and determine whether the deployment of any tools (e.g., a service benefit, notification, or displayed content) can both enhance the user experience of the current session and increase the engagement of the user 174 to the network service. Likewise, the prediction engine 130 can determine an engagement level of the transport provider 180 to the network service, analyze the representations of the transport provider's current session, and determine whether the deployment of any tools (e.g., a service benefit, notification, or displayed content) can both enhance the user experience of the transport provider's current session and increase the engagement level of the transport provider 180 to the network service.

As a primary goal, the prediction engine 130 can predict future instances of negative user experience, such as abandonment or abdication of the network service, cancelation of service requests, purchase returns, a low rating by the user 174 or transport provider 180, etc. If the contextual information in the representations meet or exceed a confidence level (e.g., a 90% probability), the prediction engine 130 can generate a prediction trigger indicating that a negative user experience will occur at a future point in time (e.g., in the next thirty seconds). The prediction trigger can indicate the nature of the predicted negative user experience, the user 174 or transport provider 180, a potential negative action (e.g., threat of request cancelation or abandonment), and the like.

The prediction trigger can be processed by a service configuration engine 110 of the computing system 100. Based on the nature of the prediction, the service configuration engine 110 can deploy a set of tools to steer the user experience away from the predicted negative user experience. Such tools can comprise notifications to the service application 175 or driver application 186, service benefits (e.g., free or discounted services, bonuses to transport providers 180), automatic cancelation and re-matching of a transport request, and the like. In some aspects, the tools can comprise punitive tools or warning notifications that can affect a perpetrating or responsible party of the predicted negative user experience. For example, if a matched transport provider 180 is to blame for the negative user experience of the matched user 174, the service configuration engine 110 can input a demerit into the provider profile 147 of the transport provider 180. This demerit can include a flag indicating the nature of the offense, a warning, an automatic low rating, or in some scenarios, exclusion from participating in the network service.

In response to a prediction trigger from the prediction engine 130, the service configuration engine 110 can determine one or more preemptive corrective actions to implement in order to prevent and/or mitigate the predicted negative user experience. In one example, the service configuration engine 110 can transmit a contextual notification to the user computing device 170, providing context or a preemptive explanation of the current user experience. In another example, the notification can comprise an apologetic notification, an instructive notification (e.g., indicating that the user 174 is at the wrong pick-up location), a suggestive notification (e.g., suggesting that the user 174 cancel the transport request with no penalty), or an appeasement notification indicating a service benefit has been deposited or otherwise associated with the user profile 146 of the user 174.

In various implementations, the service configuration engine 100 can provide one or more appeasements to the user 174, such as a future ride discount, discount for freight or goods transport, one or more free services (e.g., a free ride), a refund, a credit, and the like. In determining an appeasement for a user 174, the service configuration engine 110 can determine or otherwise look up the engagement level of the user 174. In further implementations, the service configuration engine 110 can determine a engagement level increase of the user 174 for each potential appeasement, and deploy a particular appeasement based on the determined engagement level increase for that particular appeasement.

As an example, the representation generator 150 can generate service representations indicating that a user 174 is awaiting a matched transport provider 180 at a pick-up location. The ETA indicated on the user interface 172 of the user's computing device 170 can indicate that the transport provider 180 is five minutes away. An amount of time later, the displayed ETA may increase to eight minutes, which can trigger the prediction engine 130 to generate a prediction trigger indicating that the user 174 will likely cancel the ride request. The prediction engine 130 can further determine whether the transport provider 180 is to blame for the ETA increase (e.g., whether the transport provider 180 is purposefully trying to induce a cancelation). For example, the transport provider 180 may remain parked when traffic conditions are clear, or may drive along a different route than a route displayed through the driver application 186.

If the transport provider 180 is determined to be actively attempting to induce a cancelation by the user 174, the service configuration engine 110 can transmit a suggestive notification or a warning to the computing device 185 of the transport provider 180, and/or can input a demerit in the transport provider's profile 147. In certain scenarios, the service configuration engine 110 can automatically cancel the match, and re-match the user 174 with another transport provider. As described herein, a demerit inputted into the transport provider's profile 147 can comprise an indication of the nature of the offense, a warning, or an automatic low rating. Furthermore, in order to enhance the network service in general, the service configuration engine 110 can exclude the transport provider 180 from participating in the network service if the demerits accumulate to a certain point, the provider's rating drops below a certain threshold, if the transport provider 180 has a history of poor-quality service, and/or if the offense is serious enough.

Independent of the determination of whether the transport provider 180 is responsible for the predicted negative user experience, the service configuration engine 110 can implement one or more preemptive corrective actions and/or one or more reactive or mitigative actions for the user 174, as described herein. Given the nature of the predicted negative user experience, the service configuration system 110 can implement a combination of actions, such as notifications to the transport provider 180 and the user 174, and/or service benefits to the user 174 and/or transport provider 180. It is contemplated that the service configuration engine 110 can also implement machine learning or artificial intelligence techniques to learn from the effectiveness of certain combinations of corrective actions in order to make future decisions of corrective actions. In doing so, the service configuration engine 110 can function to maximize engagement level of users 174 and transport providers 180 to the network service, which aligns with positive user experience in connection with the network service.

In various examples, the prediction engine 130 can predict a negative user experience for a transport provider 180. In such examples, the service configuration engine 110 can determine whether the user 174 is responsible, and then can implement a set of corrective actions. If the user 174 is responsible, then the service configuration engine 110 can transmit a notification to the user computing device 170, can input an automatic low rating for the user 174, input a demerit in the user's profile 146, or in certain scenarios, exclude the user 174 from the network service. Additionally or alternatively, the service configuration engine 110 can provide a service benefit (e.g., a financial bonus or compensation) and/or explanatory notifications to the transport provider 180, or re-match the transport provider 180 with a difference user 174.

For example, the user 174 may be late or not show up at a rendezvous location, or may be in the wrong pick-up location (e.g., the wrong door at an airport). The prediction engine 130 can predict this scenario if, for example, location data from the user device 170 of the user 174 indicates that the user 174 is not moving to a rendezvous location, has a walking ETA that is higher than the transport provider 180 and diverging more, and that the transport provider 180 is en route. The prediction engine 130 may predict that the transport provider 180 will provide the user 174 with a poor rating, or encounter a negative user experience with the network service if the user 174 is late or doesn't show up to the rendezvous location. In order to preempt this scenario, the service configuration engine 110 can adjust the rendezvous location (e.g., so that it is closer to the user 174) and transmit notifications indicating the changed rendezvous location. Alternatively, the service configuration system 110 can transmit a notification to the user computing device 170 indicating that the transport provider 180 is arriving, and that the user 174 is not at the rendezvous location. Additionally or alternatively, if the user 174 does not show up, the service configuration engine 110 can automatically cancel the request, re-match the transport provider 180 with another requesting user 174, and provide compensation to the transport provider 180.

In another example, the representations may indicate a current session of a prospective transport provider. The prediction engine 130 can predict that the prospective transport provider will not sign up for the network service (e.g., based on long pause by the prospective transport provider on an interface screen as indicated in a generated representation). Based on this prediction, the service configuration engine 110 can provide a corrective action, such as a walk-through feature, or a notification of a service benefit (e.g., two times earnings on the first five rides serviced) to induce the prospective transport provider to sign on to the network service.

The representations can further indicate current negative user experiences which the service configuration engine 110 can correct reactively. For example, the representations can indicate a lost item in a vehicle (e.g., a user's phone) based on the location data from the user's computing device 170 indicating co-location with the transport provider's device 185, or a service message transmitted from the user 174 after drop-off. In such a scenario, the service configuration engine 110 can provide a notification to the transport provider 180 indicating the lost item, and a rendezvous location to the user 174 and transport provider 180. Additionally, the service configuration engine 110 can provide the transport provider 180 with a service benefit (e.g., a bonus payment) for performing the good deed of returning the lost item. In the case that the lost item is the user's computing device 170, the service configuration engine 110 may provide the transport provider 180 with a home address or mailing address of the user 174 for returning the device, or the service configuration engine 110 can provide a drop-off location and transmit a message (e.g., via e-mail) to the user 174 indicating the drop-off location.

In another example, the representations can indicate that the user 174 has created a duplicate account. For example, the prediction engine 130 can identify the user's name, payment information, location data (e.g., GPS data indicating a home location), and/or home address and determine that the same information exists in a different account. In response, the service configuration engine 110 can prevent the creation of a duplicate account by transmitting recommendation notifications indicating the existing account, recommending merging the accounts, or automatically merging the accounts.

In another example, the representations for a user 174 and transport provider 180 can indicate an airport pick-up and that the user 174 is at the incorrect pick-up location. The prediction engine 130 can predict a missed pick-up and generate a prediction trigger indicating the scenario. Based on the scenario, the service configuration engine 110 can generate an update feature through the service application 175 to enable the user 174 to either update the pick-up location to the user's current location, or provide an indication of a delay (e.g., waiting in baggage claim). The service configuration engine 110 can also automatically update the rendezvous location and/or provide messages to the transport provider 180 and user 174 that indicate contextual information for the pick-up. Following such messages, the service configuration engine 110 can provide highly granular instructions to coordinate the pick-up. For example, in the event of a delay or wrong-pick-up location, the service configuration engine 110 can take control of coordinating the pick-up by entering a granular coordination mode that provides walk-though instructions to the user 174 and/or transport provider to make the pick-up more seamless and less confusing.

In certain implementations, the service configuration engine 110 can provide interface features on the user computing device 170 to streamline communications between the user 174 and the transport provider 180. For example, upon predicting a negative user experience (e.g., a wrong or illegal pick-up location), the service configuration engine 110 can transmit display data that provides an interface feature indicating the problem, and a set of selectable options to update the pick-up location to a better pick-up location. Upon selection by the user 174, the service configuration engine 110 can transmit an update notification to the provider computing device 185 of the transport provider 180 and/or update navigation directions to the new location. For example, the interface feature can provide a list of popular nearby pick-up locations that result in seamless pickups, and the user can select from any one of them to cause the computing system 100 to transmit update messages and/or reconfigure the navigation instructions to the transport provider 180.

It is contemplated that the predictive artificial intelligence model can preemptively mitigate or correct negative user experiences through the prediction and corrective techniques described with respect to the prediction engine 130 and the service configuration engine 110. In doing so, the computing system 100 of FIG. 1 can maximize the engagement of its users 174 and transport providers 180 while increasing positive user experience and seeking to eliminate or minimize negative user experiences with the network service. As provided herein, the computing system 100 can be implemented in connection with an on-demand transport service, but can also be implemented in connection with any application service, such as a social media service, content provider service, financial service, marketplace service (e.g., buying and selling goods), and the like.

Computing Device

Figure 2:
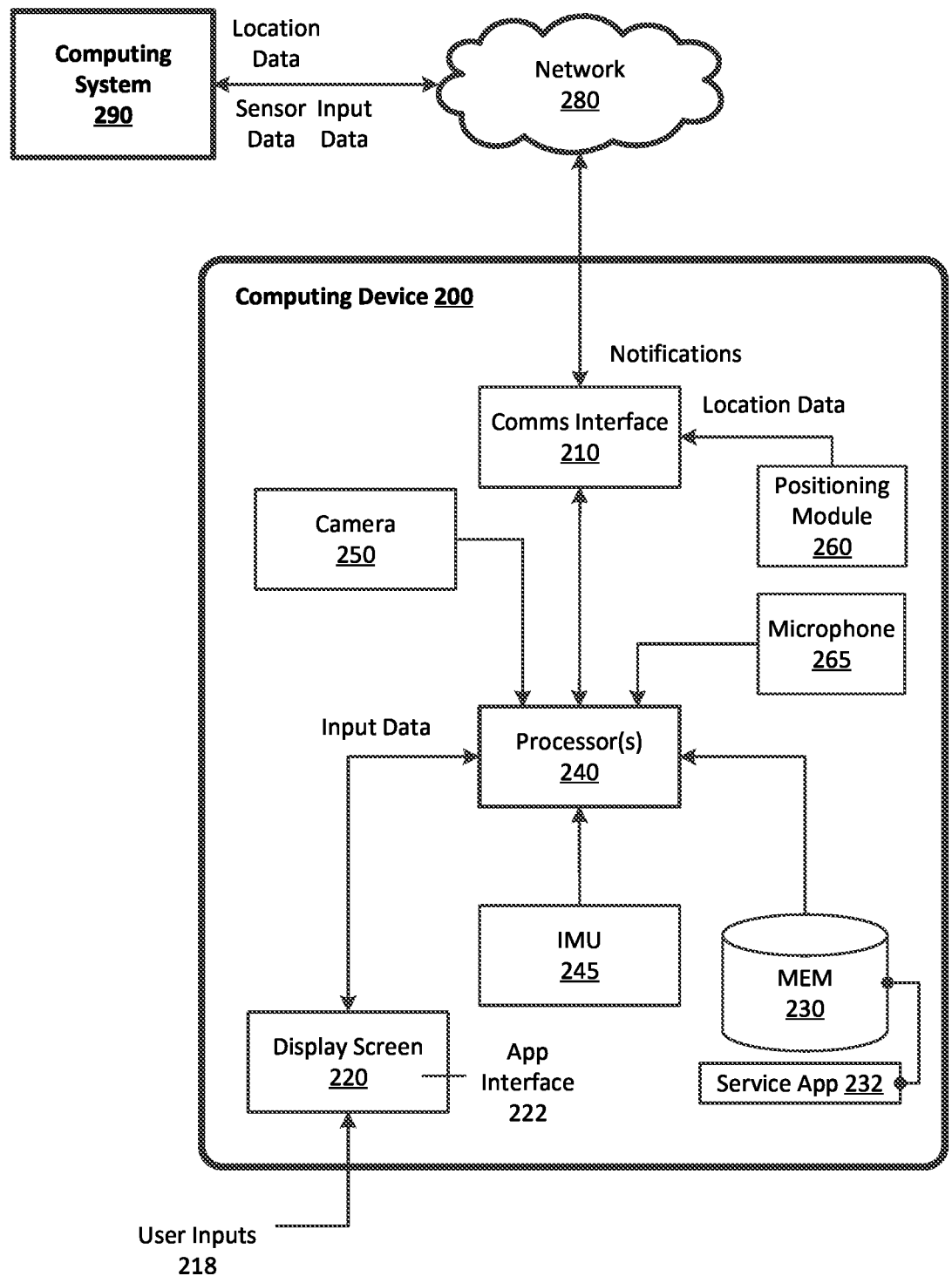
FIG. 2 depicts an example computing device utilized by users of an application service, according to examples described herein.

FIG. 2 depicts an example computing device utilized by users of an application service (e.g., requesting users 174 and transport providers 180 as shown in FIG. 1), according to examples described herein. In many implementations, the computing device 200 can comprise a mobile computing device, such as a smartphone, tablet computer, laptop computer, VR or AR headset device, and the like. As such, the computing device 200 can include typical telephony features such as a microphone 265, a camera 250, and inertial measurement unit (IMU) 245 and a communication interface 210 to communicate with external entities using any number of wireless communication protocols. In certain aspects, the computing device 200 can store a designated application (e.g., a service app 232) in a local memory 230. In variations, the memory 230 can store additional applications executable by one or more processors 240 of the computing device 200, enabling access and interaction with one or more host servers over one or more networks 280.

In response to a user input 218, the service app 232 can be executed by a processor 240, which can cause an app interface 222 to be generated on a display screen 220 of the computing device 200. The app interface 222 can enable the user to, for example, check current price levels and availability for the on-demand network-based service. In various implementations, for transport services, the app interface 222 can further enable the user to select from multiple service types, such as a carpooling service, a regular ridesharing service, a professional ride service, a van or high-capacity vehicle transport service, a luxurious ride service, and the like.

The user can generate a transport request via user inputs 218 provided on the app interface 222. For example, the user can select a service location, view the various service types and estimated pricing, and select a particular service type (e.g., for transportation to an inputted destination). As provided herein, the service application 232 can further enable a communication link with a network computing system 290 over the network 280, such as the computing system 100 as shown and described with respect to FIG. 1.

The processor 240 can transmit the transport requests via a communications interface 210 to the backend computing system 290 over a network 280. In response, the computing device 200 can receive confirmations from the computing system 290 indicating a selected transport provider that will fulfill the transport request and rendezvous with the user at a rendezvous location. In various examples, the computing device 200 can further include a positioning module 260 (e.g., GPS receiver), which can provide location data indicating the current location of the requesting user to the computing system 290 to, for example, establish the rendezvous location and/or select an optimal transport provider to fulfill the transport request.

The computing device 200 can further be utilized by the computing system 290 to receive sensor data (e.g., audio data, accelerometer data, image data, etc.) and input data corresponding to the use's interactions with the app interface 222. These inputs can include providing driver feedback and/or a driver rating for a transport provider, making payment for rides or deliveries, configuring a transport request, scrolling content (e.g., offers, or map content to view supply-demand information), and the like. Such data, along with the location data, can comprise event data received and processed by the computing system 290 to predict and prevent negative user experiences, as described herein.

According to examples provided herein, the computing device 200 can comprise a transport provider's computing device utilized by transport providers of an on-demand transport service. In such examples, the service app 232 can comprise a driver application that the transport provider can execute to provide input data in order to, for example, receive ride requests or invitations from the computing system 290, accept or decline the invitations, indicate a status (e.g., on-trip, on-duty, available, off-duty, drop-off, pick-up, etc.), provide ratings and/or feedback for users, and the like. The location data, input data, and sensor data from the transport provider's computing device 200 can also comprise the event data that the computing system 290 utilizes to predict and prevent negative user experiences.

Methodology

Figure 3:
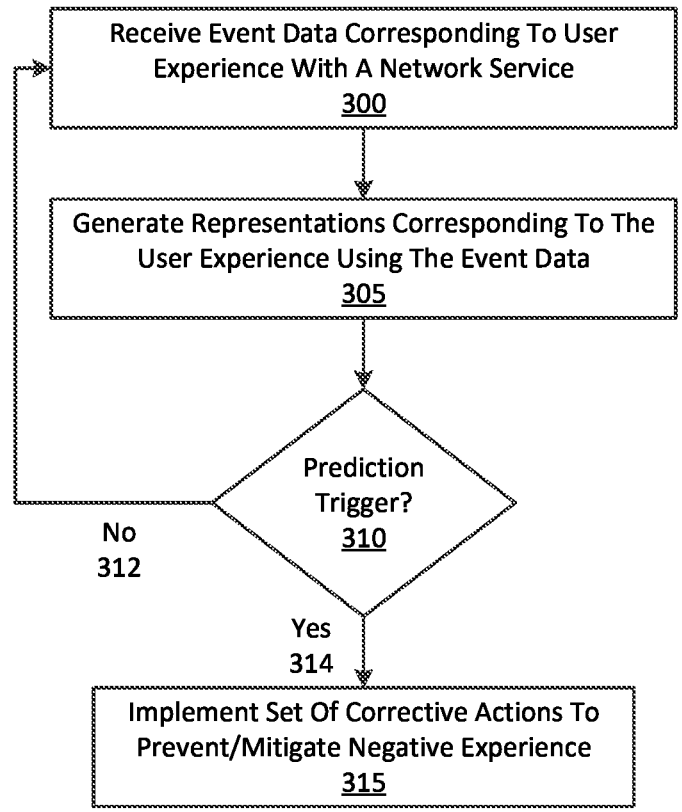
FIGS. 3 and 4 are block diagrams illustrating example methods of preemptively detecting and preventing negative user experiences in connection with an application service, according to examples described herein.
Figure 4:
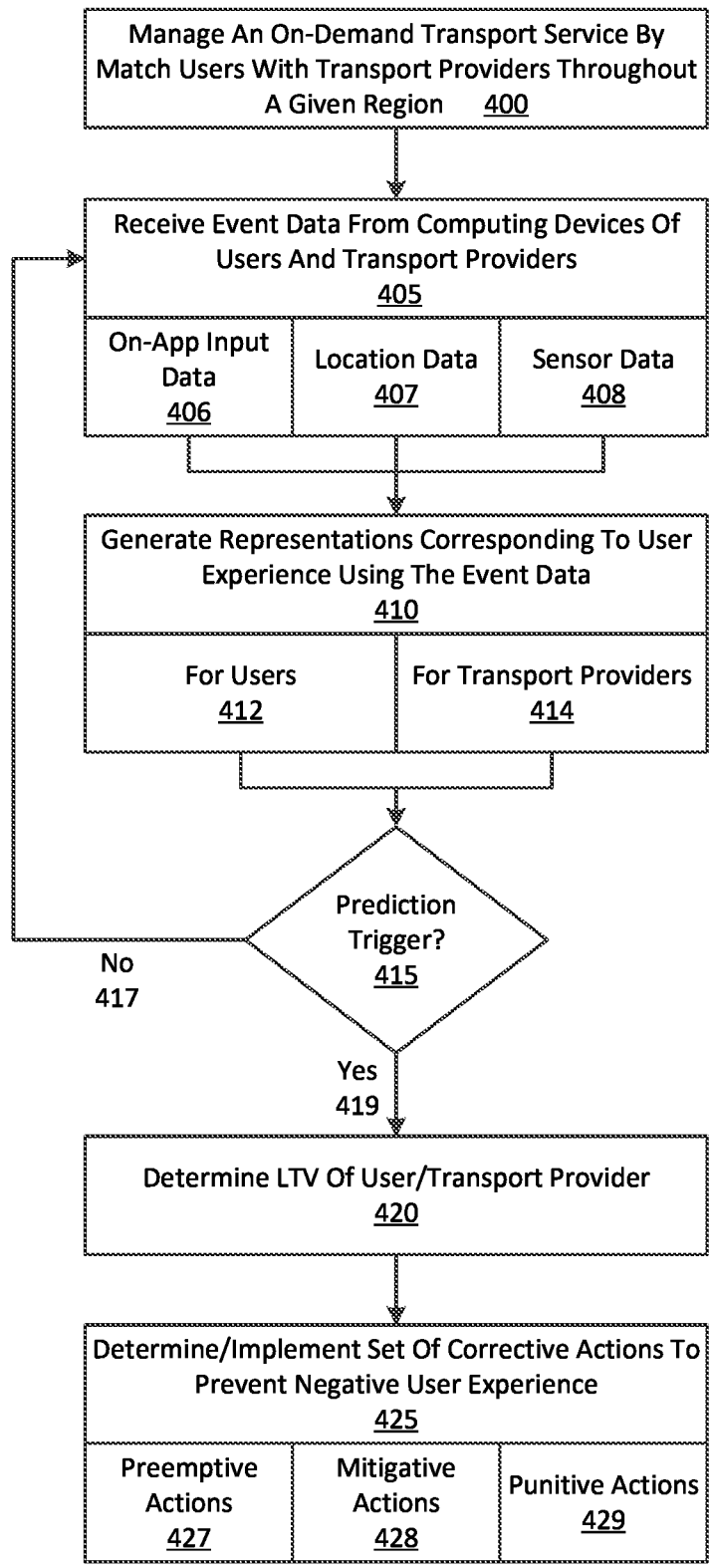

FIGS. 3 and 4 are flowcharts describing example methods of preemptively detecting and preventing negative user experiences in connection with an application service, according to examples described herein. In the below descriptions of FIGS. 3 and 4, reference may be made to reference characters representing like features as shown and described with respect to FIGS. 1 and 2. Furthermore, the methods described in connection with FIGS. 3 and 4 may be performed by an example computing system 100, 290 implementing the predictive artificial intelligence techniques described herein, as shown and described with respect to FIGS. 1 and 2.

Referring to FIG. 3, the computing system 100 can receive event data corresponding to a user's experience with a network service (300). As described herein, the event data can comprise input data corresponding to the user's interactions with an application interface 222 generated on a display screen 220 of the user's computing device 200. The event data can further include sensor data from one or more sensors of the computing device 200, and/or location data from a positioning module 260 of the computing device 200. In various implementations, the event data can further include inputs, location data, and/or interactions with the service application 175 of other users 174 and/or the driver application 186 of transport providers 180, such a matched transport provider 180 en route to rendezvous with the user 174.

In various examples, the computing system 100 can generate representations corresponding to the user experience of a user 174 using the event data (305). As described herein the representations can comprise contextual information corresponding to the user's current experience with the network service. For example, the representations can indicate the user's current status with respect to the network service (e.g., viewing content, checking prices, configuring a request, awaiting service, currently being serviced, etc.). The representations may also indicate the service provider's status (e.g., on-trip, en route, off-duty), location, route, and the like. The representations may provide additional context, such as traffic conditions, the network service conditions (e.g., transport supply-demand conditions, goods supply-demand conditions, etc.), and the like.

According to examples described herein, the computing system 100 can predict, based on a confidence level (e.g., a 90% probability), whether the user 174 will have a negative user experience at a future instance (310). If not (312), the computing system 100 can proceed with receiving the event data and generating representations accordingly. However, if a negative user experience prediction is triggered (314), then the computing system 100 can implement a set of corrective actions to prevent and/or mitigate the negative user experience, as described herein (315).

FIG. 4 is a flow chart describing an example method of predicting and preventing or mitigating negative user experiences in connection with a transport service. Referring to FIG. 4, the computing system 100 can manage an on-demand transport service by matching requesting user 174 with available transport providers 180 operating throughout a given region (400). In various examples, the computing system 100 can receive event data from computing devices of the users 174 and the transport providers 180 (405). As described herein, the event data can comprise on-app input data (406), location data (407), and/or sensor data (408) from the computing device. In further examples, the event data can comprise any information attributable to the network service, such as the transport supply versus request demand conditions, price conditions, current traffic conditions, weather conditions, etc.

Using the event data, the computing system 100 can generate representations corresponding to user experience in connection with the transport service (410). In various aspects, the computing system 100 can generate such representations for the user 174 (412) and for the transport provider 180 (414). Based on the representations, the computing system 100 can predict whether a negative user experience will occur for either the user 174 or the transport provider 180 at a future instance in time or over a given time interval (e.g., thirty seconds) (415). For example, the computing system 100 can execute an artificial intelligence model that processes the representations to make a future prediction of whether any particular user 174 or transport provider 180 in the given region will have a negative user experience at a future instance. If not (417), then the computing system 100 can continue to receive event data and generate representations accordingly.

However, if so (419), then the computing system 100 can implement preemptive corrective actions to prevent or mitigate the negative experience in accordance with the examples described herein. In certain aspects, the corrective actions can be correlated to an engagement level of the user 174 or the transport provider 180 to the transport service. Thus, the computing system 100 can determine a lifetime value of the user 174 or transport provider 180 to the transport service (420). If the user 174 or transport provider 180 is highly valuable (e.g., utilizes the service often, provides good service, has high ratings, etc.), then the computing system 100 can correlate the corrective actions accordingly. For example, a highly engaged user 174 can be provided with higher valued service benefits to prevent a future negative user experience, whereas a less engaged user may be provided with lower valued service benefits as a corrective action. According to examples described herein, the computing system 100 can determine and implement a set of corrective actions to prevent and/or mitigate the predicted negative user experience (425).

As described herein, these corrective actions can comprise preemptive actions (427), such as providing a contextual notification indicating a reason for the predicted negative user experience at the future instance. It is contemplated that such preemptive notifications can prepare the user 174 or transport provider 180 and reduce the weightiness of a future negative user experience. The preemptive actions can further include transmitting a warning or request notification to a responsible party, for example, if the user 174 or transport provider 180 is responsible for being late or for an increasing ETA. Such notifications can comprise instructions to, for example, move to a difference pick-up location, follow a displayed route, and the like. The preemptive actions can further include automatically canceling a transport match between the user 174 and the matched transport provider 180, and re-matching the user 174 with a different transport provider 180. For example, if the transport provider 180 is not moving or not following a correct route to attempt to induce a cancelation (e.g., which can incur a penalty for the user 174 and a financial benefit for the transport provider 180), the computing system 100 can cancel the match with no penalty to the user 174.

The corrective actions can further include mitigative actions (428), such as providing a service benefit (e.g., a discount for the transport service, a bonus payment, gift, etc.), sending notifications of an automatic service benefit to the user 174 or transport provider 180, re-matching the user 174 with a closer transport provider 180, and the like. The corrective actions can further include punitive actions (429), such as inputting a demerit into a responsible transport provider's profile 147, disabling the account of the transport provider 180, providing a notification to the user 174 indicating the corrective action, and the like. It is contemplated that a large number of use cases can fit within the predictive framework described herein to prevent negative user experiences. It is further contemplated that the predictive artificial intelligence techniques described herein can be implemented across an entire network service platform, and applied to any user of the network service (e.g., requesting users 174, transport providers 180, goods suppliers, etc.) in order to, over time, provide enhanced user experiences and make the network service more robust.

Hardware Diagram

Figure 5:
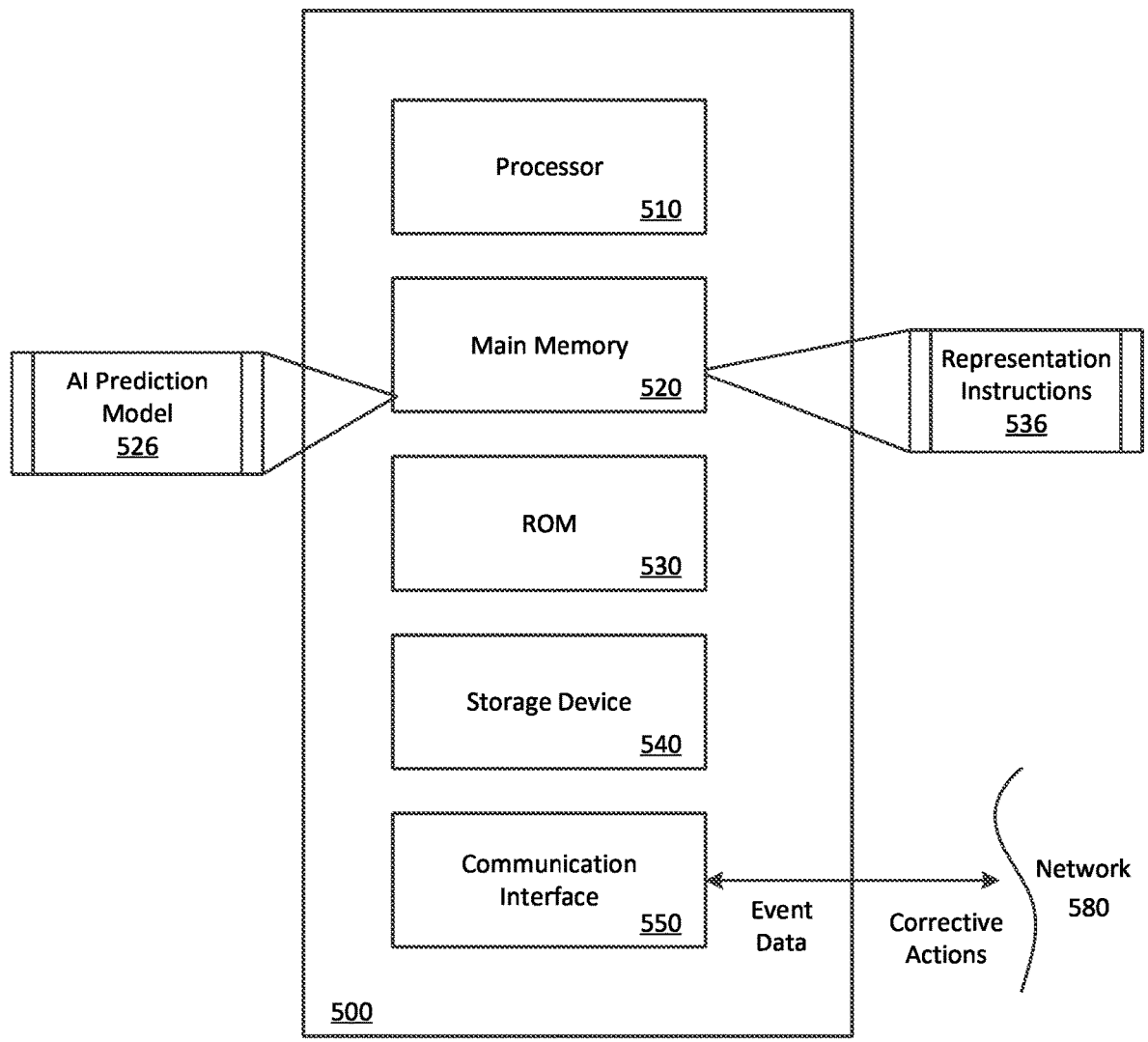
FIG. 5 is a block diagram that illustrates a computing system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service for providing transportation services throughout a given region (e.g., a metropolitan area). In the context of FIGS. 1 and 2, the computing system 100, 290 may be implemented using a computer system 500 such as described by FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580 (e.g., cellular network) through use of the network link (wireless or wired). Using the network link, the computer system 500 can communicate with one or more computing devices, one or more servers, and/or one or more autonomous vehicles. In accordance with examples, the computer system 500 can receive event data from users of the network service. The executable instructions stored in the memory 530 can include representation instructions 536, which the processor 510 executes to process the event data and generate representations corresponding to a user's current user experience in connection with a network service.

By way of example, the instructions and data stored in the memory 520 can be executed by the processor 510 to implement an example computing system 100 of FIG. 1. In performing the operations, the processor 510 can further execute an artificial intelligence prediction model 526, which causes the processor 510 to process the representations to predict instances of negative user experience and implement a set of corrective actions to prevent and/or mitigate the negative user experience.

The processor 510 is configured with software and/or other logic to perform one or more processes, steps and other functions described with implementations, such as described with respect to FIGS. 1-5, and elsewhere in the present application. Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system implementing a transport service, comprising:
    a network communication interface to communicate, over one or more networks, with a service application executing on computing devices of requesting users of the transport service;
    one or more processors; and
    one or more memory resources storing instructions that, when executed by the one or more processors, cause the computing system to:
        monitor, over the one or more networks, event data corresponding to a current user experience of a requesting user during a current application session with the transport service, the event data comprising at least one of location data, input data on the service application by the requesting user, or sensor data from a computing device of the requesting user;
        based on the event data, generate one or more representations corresponding to the current user experience of the requesting user, the one or more representations further corresponding to historical utilization of the transport service by the requesting user;
        execute an artificial intelligence model to analyze the one or more representations in order to (i) predict a negative user experience for the requesting user at a future time during the current application session, the predicted negative user experience corresponding to a prediction that the requesting user will cancel a requested ride from a matched transport provider in connection with the transport service, and (ii) determine that the matched transport provider is inducing the requesting user to cancel the requested ride; and
        in response to predicting the negative user experience and determining that the matched transport provider is inducing the requesting user to cancel the requested ride, implement one or more corrective actions during the current application session through the service application to prevent or mitigate the predicted negative user experience.

2. The computing system of claim 1, wherein the predicted negative user experience further comprises a prediction that the requesting user will abandon the transport service.

3. The computing system of claim 1, wherein the event data further comprises location data indicating a dynamic location of the matched transport provider matched to rendezvous with the requesting user to service a transport request configured by the requesting user.

4. The computing system of claim 1, wherein the one or more corrective actions comprise at least one of transmitting a notification to the computing device of the transport provider, providing a service benefit to the requesting user, inputting a demerit in a provider profile of the matched transport provider, or automatically matching the requesting user with a different transport provider.

5. The computing system of claim 1, wherein the executed instructions further cause the computing system to:
    determine, based on historical user data indicating historical utilization of the transport service by the requesting user, an engagement level of the requesting user with the transport service; and
    determine the one or more corrective actions based, at least in part, on the engagement level of the requesting user.

6. A non-transitory computer-readable medium storing instructions that, when executed by one or more processors, cause the one or more processors to:
    communicate, over one or more networks, with a service application executing on computing devices of requesting users of a transport service;
    monitor, over the one or more networks, event data corresponding to a current user experience of a requesting user during a current application session with the transport service, the event data comprising at least one of location data, input data on the service application by the requesting user, or sensor data from a computing device of the requesting user;
    based on the event data, generate one or more representations corresponding to the user experience of the requesting user, the one or more representations further corresponding to historical utilization of the transport service by the requesting user;
    execute an artificial intelligence model to analyze the one or more representations in order to (i) predict a negative user experience for the requesting user at a future time during the current application session, the predicted negative user experience corresponding to a prediction that the requesting user will cancel a requested ride from a matched transport provider in connection with the transport service, and (ii) determine that the matched transport provider is inducing the requesting user to cancel the requested ride; and
    in response to predicting the negative user experience and determining that the matched transport provider is inducing the requesting user to cancel the requested ride, implement one or more corrective actions during the current application session through the service application to prevent or mitigate the predicted negative user experience.

7. The non-transitory computer-readable medium of claim 6, wherein the predicted negative user experience further comprises a prediction that the requesting user will abandon the transport service.

8. The non-transitory computer-readable medium of claim 6, wherein the event data further comprises location data indicating a dynamic location of the matched transport provider matched to rendezvous with the requesting user to service a transport request by the requesting user.

9. The non-transitory computer readable medium of claim 6, wherein the executed instructions further cause the one or more processors to:
  determine, based on historical user data indicating historical utilization of the transport service by the requesting user, an engagement level of the requesting user with the transport service; and
  determine the one or more corrective actions based, at least in part, on the engagement level of the requesting user.

10. A method of implementing a transport service, the method being performed by one or more processors and comprising:
  communicating, over one or more networks, with a service application executing on computing devices of requesting users of the transport service;
  monitoring, over the one or more networks, event data corresponding to a current user experience of a requesting user during a current application session with the transport service, the event data comprising at least one of location data, input data on the service application by the requesting user, or sensor data from a computing device of the requesting user;
  based on the event data, generating one or more representations corresponding to the current user experience of the requesting user, the one or more representations further corresponding to historical utilization of the transport service by the requesting user;
  executing an artificial intelligence model to analyze the one or more representations in order to (i) predict a negative user experience for the requesting user at a future time during the current application session, the predicted negative user experience corresponding to a prediction that the requesting user will cancel a requested ride from a matched transport provider in connection with the transport service, and (ii) determine that the matched transport provider is inducing the requesting user to cancel the requested ride; and
  in response to predicting the negative user experience and determining that the matched transport provider is inducing the requesting user to cancel the requested ride, implementing one or more corrective actions during the current application session through the service application to prevent or mitigate the predicted negative user experience.

11. The method of claim 10, wherein the predicted negative user experience further comprises a prediction that the requesting user will abandon the transport service.

12. The method of claim 10, wherein the event data further comprises location data indicating a dynamic location of the matched transport provider matched to rendezvous with the requesting user to service a transport request configured by the requesting user.

13. The method of claim 10, wherein the one or more corrective actions comprise at least one of transmitting a notification to the computing device of the transport provider, providing a service benefit to the requesting user, inputting a demerit in a provider profile of the matched transport provider, or automatically matching the requesting user with a different transport provider.

14. The method of claim 10, further comprising:
  determining, based on historical user data indicating historical utilization of the transport service by the requesting user, an engagement level of the requesting user with the transport service; and
  determining the one or more corrective actions based, at least in part, on the engagement level of the requesting user.

* * * * *